No. 614,986. Patented Nov. 29, 1898.
A. N. RUSSELL.
WAGON.
(Application filed Aug. 28, 1897.)
(No Model.) 2 Sheets—Sheet 1.

WITNESSES.
William E. Boyer.
C. P. Lukan

INVENTOR.
Albert N. Russell
By E. H. Bradford
Attorneys.

THE NORRIS PETERS CO., PHOTO-LITHO., WASHINGTON, D. C.

No. 614,986. Patented Nov. 29, 1898.
A. N. RUSSELL.
WAGON.
(Application filed Aug. 28, 1897.)
(No Model.) 2 Sheets—Sheet 2.
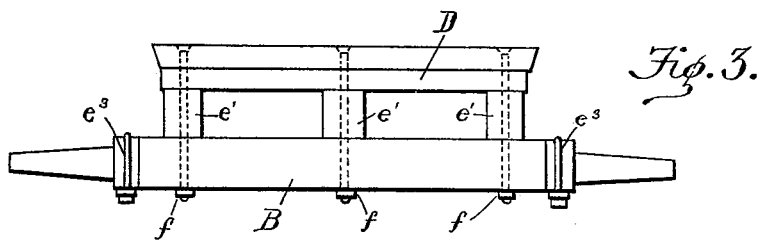
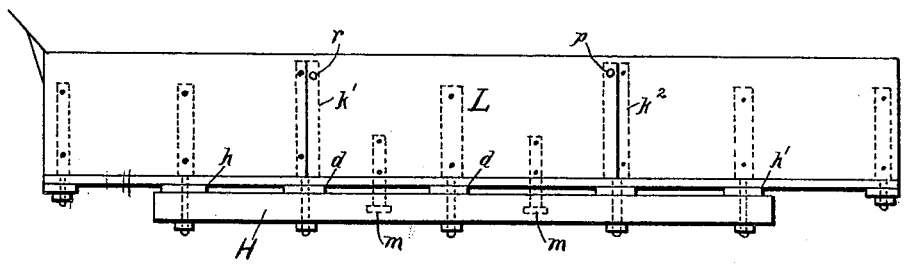
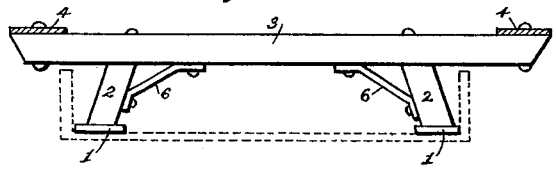
WITNESSES.
William E. Boyer.
INVENTOR.
Albert N. Russell
by D. H. Bradford
Attorney

UNITED STATES PATENT OFFICE.

ALBERT N. RUSSELL, OF CHERRYVALE, KANSAS.

WAGON.

SPECIFICATION forming part of Letters Patent No. 614,986, dated November 29, 1898.

Application filed August 28, 1897. Serial No. 649,815. (No model.)

*To all whom it may concern:*

Be it known that I, ALBERT N. RUSSELL, a citizen of the United States, residing at Cherryvale, in the county of Montgomery and State of Kansas, have invented certain new and useful Improvements in Farm and Truck Wagons; and I do hereby declare the following to be a full, clear, and exact description of the invention, such as will enable others skilled in the art to which it appertains to make and use the same, reference being had to the accompanying drawings, forming a part of this specification.

This invention relates to improvements in farm and truck wagons; and it has for its object to provide a cheap, durable, and useful wagon that can be adapted to general purposes.

A further object is to provide a wagon that will be low and at the same time will permit of a short turn.

The invention consists in the construction and arrangement of the various parts to be hereinafter described, and particularly pointed out in the claims.

Figure 1:
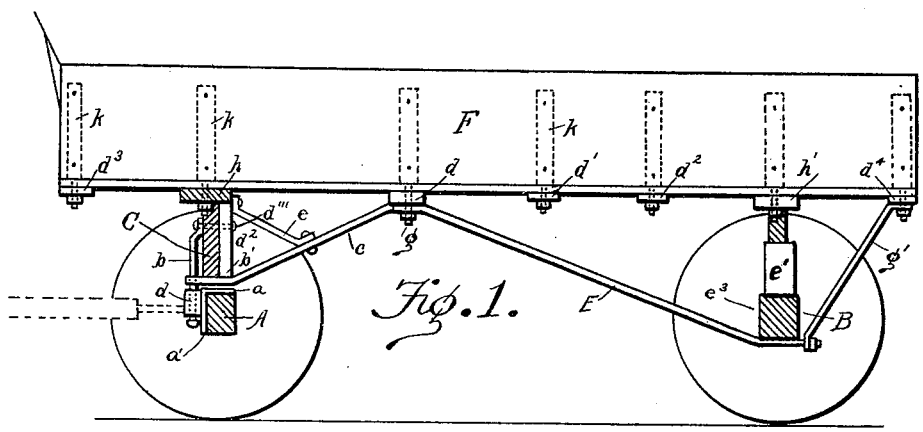
Figure 2:
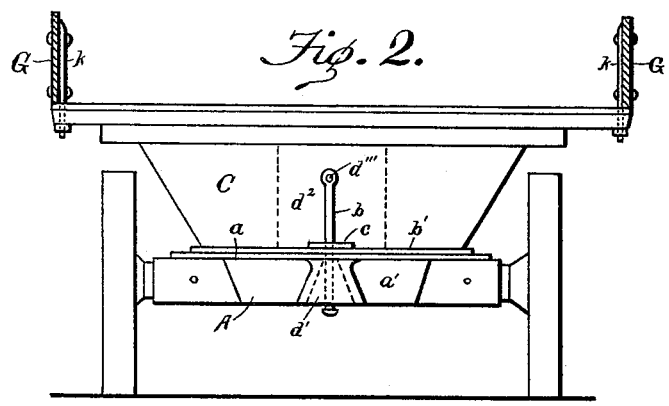
Figure 5:
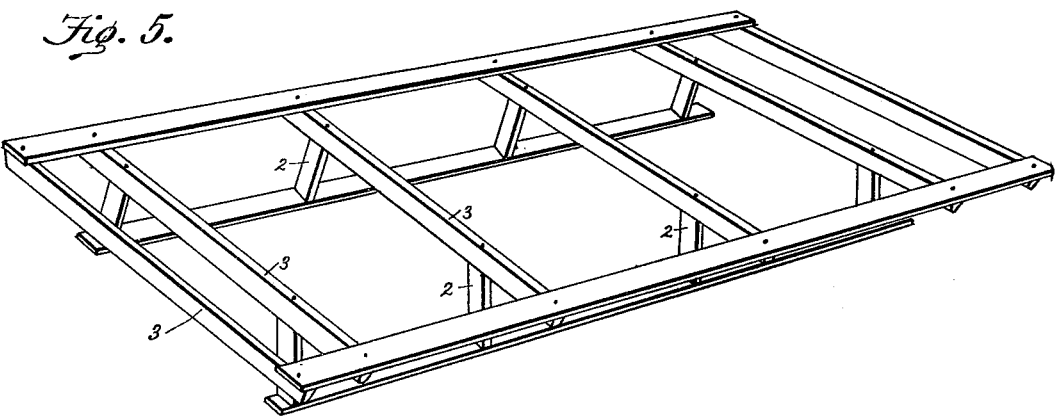

Referring to the accompanying drawings, Figure 1 shows my improved wagon in longitudinal section. Fig. 2 is a front elevation with the tongue removed therefrom. Fig. 3 is a rear elevation. Fig. 4 shows in side elevation a modified form of wagon-bed. Fig. 5 shows in perspective a hay or grain rack to be employed in connection with either the bed shown in Figs. 1 or 4. Fig. 6 is a cross-section of the rack, and Fig. 7 shows in detail the center sill and a truss-rod secured thereto.

Like letters and figures of reference refer to corresponding parts throughout the different views.

A and B indicate the front and rear axles of the wagon-gear. The wheels upon the forward axle are preferably made to travel inside of the standard-gage track, while those upon the rear axle travel outside thereof. By this means when the tires are of suitable width the road-bed is kept in much better condition than with the use of the ordinary vehicle.

The forward axle is provided upon its upper side with the axle-plate $a$, which has formed integral therewith a front plate $a'$, through which the triangular-shaped king-bolt opening is made. This hole, through which the king-bolt $b$ passes, is round at its upper end, and in a plane substantially parallel to the axle it is widened gradually toward the bottom thereof. Above the axle and adapted to rest and turn thereon is the bolster-plate $b'$, secured to the under side of the bolster C, and between the bolster and bolster-plate is a brace or draw-bar $c$, having its forward end carried out beyond the line of the king-bolt, where it terminates with the hole through which the king-bolt is arranged to pass, and its rear end carried backward and upward to be secured to one of the cross-ties $d$. The king-bolt $b$ is provided with a head upon its lower end and is inserted at the bottom through the triangular hole or slot $d'$ in the front plate $a'$, through the opening in the forward projecting end of the draw-bar, and thence up to a point slightly above the horizontal center line of the bolster, where it terminates with an eye, through which is engaged the bolt $d'''$, which also passes through the bolster and the plank $b'$ at the rear thereof to hold the king-bolt in position. As a means of strengthening and stiffening these parts I provide a brace $e$, which has its forward end bolted through the upper edge of the bolster and its rear end carried downward to a point substantially midway between the two ends of the draw-bar, where it is firmly secured by suitable means.

The rear axle is built up by means of the bearing-blocks $e'$, (seen best in Fig. 3,) which are secured between the rear bolster D and the axle by means of the bolts $f$. The braces E have their rear ends secured to the under side of the rear axle by means of the strap-bolts $e^3$, which are arranged to engage over the thimble-skein and their lower ends adapted to pass through bolt-holes in the braces and to receive holding-nuts thereon and their forward ends firmly secured to the strap-bolts $k$, which are employed to unite the bed and cross-sill $d$. The rear ends of these braces extend a short distance beyond the rear of the bolster B and are arranged to receive thereon the lower ends of the rear braces $g'$, the upper ends of which are secured to the rear cross-tie $d^4$ of the bed.

The cap-plank $h$ is firmly secured to the top of the bolster C, and in the form of bed shown in Fig. 1 this cap-plate takes the part of one of the cross-ties $d$, $d'$, $d^2$, $d^3$, and $d^4$, and the cap-plank $h'$ at the rear is also secured to the top of the bolster and is adapted to take the part of one of the cross-ties.

The wagon-bed in my improved vehicle forms a portion of the framework by which the various parts are braced. As shown in Fig. 1, the cross-ties and cap-planks form the supports for the bottom of the bed F, and through the ends of these cross-ties and cap-planks and arranged to extend upward along the edges of the bottom and substantially at right angles to the plane thereof are bolted the lower ends of a number of inside irons $k$, to the outside of which are riveted the side-boards G G' of the bed. The end-boards may be inserted in the common and well-known manner—as, for example, by arranging ways in the ends of the side-boards in which the end-boards may be engaged and secured by suitable bolts or tie-rods.

In the modified form which I have shown in Fig. 4 I provide the sills H H, arranged longitudinally along the under side of the bed at the ends of the cross-ties, and the irons $k$ $k$ are so constructed at their lower ends as to pass entirely through the bottom of the bed, the cross-tie, and the sill, where they are terminated by means of holding-nuts. At the center of the bed I provide the third sill. (Shown in detail in Fig. 7.) The purpose of illustrating this part as separate from the frame is to show the manner of securing the truss-rod J when it is found necessary to give strength to those parts. In securing this rod in position the forward end is passed through the cap-plank $h$ over the forward bolster and the rear end secured through the rear cap-plate $h'$ over the rear bolster. When these are in position and the center point engaged beneath the lug $l$, secured to the under side of the sill, the greater part of the strain will be taken up by the rod. A novel feature is shown in this latter form of bed in Fig. 4 at L, consisting of a central removable portion of the sides. This part L may either be held in position by means of the overlapping inside irons $k'$ $k^2$ or, if desired, it may be hinged at its lower end to the outer sill H, as indicated in dotted lines at $m$. Of course in this case when the board is swung upward into position the upper end would of necessity require means for support. This may be provided, as I have illustrated, by the bolts $r$, which are arranged to pass through the end of the swinging board and the irons $k'$ $k^2$. It will be apparent that in this construction the bed forms an essential part of the wagon-gear, and should it be found necessary to employ what is commonly known as a "hay" or "grain" rack some means other than that commonly utilized in connection with the ordinary wagon would have to be supplied. In Figs. 5 and 6 I have illustrated a rack particularly adapted to be used in connection with the above-described wagon-bed. The sills 1 are adapted to set in corners of the bed, and at intervals along their lengths there are a series of posts 2, firmly secured to the sills and extending upward and inward at an incline, as shown in Fig. 6. When a suitable height has been reached to clear the sides of the bed, the cross-beams 3 are arranged upon the upper ends of the posts to extend laterally over the sides of the bed, where they form a support for the side rails 4. Should it be found necessary to strengthen this structure, the braces 6 may be added, having their lower ends firmly bolted to the foot of the posts and their upper ends extending inward and upward, where they are firmly secured to the cross-beams.

It will be obvious that the structure which I have described offers many superior advantages over that of anything in its class yet known to the art, and while I have preferred to illustrate my invention in the particular form herein shown and described I desire to have it understood that such modifications as will not materially affect the results may be made without departing from the spirit and scope of my invention.

Having thus described my invention, what I claim is—

1. In a wagon, the combination with forward and rear axles, wheels mounted upon said axles, an axle-plate secured to said forward axle having a triangular slot formed therein, a forward bolster having a bolster-plate secured to the under side thereof arranged to rest and turn upon said axle-plate, a king-bolt having a head upon its lower end and arranged to extend through the triangular slot, and means for securing its upper end to the forward bolster, a rear bolster secured upon said rear axle, a wagon-bed having cross-ties secured to its under side, a draw-bar secured to said bolster and one end of said cross-tie, and means for securing said rear axle to said wagon-bed whereby the structure is braced, substantially as described.

2. In a wagon, the combination of a forward and rear axle, wheels mounted upon said forward axle having a gage less than the standard, wheels mounted upon said rear axle, having a gage greater than the standard, an axle-plate having a triangular-shaped king-bolt hole, secured to said forward axle, a bolster having a bolster-plate mounted upon said forward axle, a rear bolster secured to the bearing-blocks upon said rear axle, cap-planks secured to the upper surfaces of said bolsters, a wagon-bed adapted to be bolted to said cap-planks, a draw-bar having its forward end secured to the forward bolster, and terminated at its outward-extending end with an opening, and having its rear end secured to the under side of said wagon-bed, a king-bolt provided with a head upon its lower end, arranged to engage within the triangular hole in said axle-plate and the hole in the forward-extending end of the draw-bar, and means for securing the upper end of said king-bolt to the bolster, braces arranged to engage the rear axle and wagon-bed, and means for securing them in position, substantially as described.

In witness whereof I have hereunto set my hand and seal this 31st day of July, 1897.

ALBERT N. RUSSELL. [L. S.]

Witnesses:
E. S. McDONALD,
GEO. W. MORAIGN.